United States Patent
Flores

(10) Patent No.: US 11,187,717 B2
(45) Date of Patent: Nov. 30, 2021

(54) RADIO FREQUENCY ACCELEROMETER

(71) Applicant: Ruben Flores, Waukesha, WI (US)

(72) Inventor: Ruben Flores, Waukesha, WI (US)

(*) Notice: Subject to any disclaimer, the term of this patent is extended or adjusted under 35 U.S.C. 154(b) by 0 days.

(21) Appl. No.: 16/162,019

(22) Filed: Oct. 16, 2018

(65) Prior Publication Data

US 2020/0116752 A1   Apr. 16, 2020

(51) Int. Cl.
| | |
|---|---|
| *G01P 15/097* | (2006.01) |
| *G01H 11/08* | (2006.01) |
| *G01P 15/09* | (2006.01) |
| *G01P 15/18* | (2013.01) |

(52) U.S. Cl.
CPC .......... *G01P 15/0975* (2013.01); *G01H 11/08* (2013.01); *G01P 15/09* (2013.01); *G01P 15/18* (2013.01)

(58) Field of Classification Search
CPC .................................................. G01P 15/0975
See application file for complete search history.

(56) References Cited

U.S. PATENT DOCUMENTS

| | | |
|---|---|---|
| 3,233,463 A | 2/1966 | Shaw |
| 3,805,097 A | 4/1974 | Yanchich |
| 4,344,010 A * | 8/1982 | Vig .......................... H03H 9/58 |
| | | 310/315 |
| 4,410,822 A * | 10/1983 | Filler ....................... H03H 9/58 |
| | | 29/25.35 |
| 4,549,436 A * | 10/1985 | Barkhoudarian ... G01P 15/0975 |
| | | 73/514.02 |
| 4,575,690 A * | 3/1986 | Walls ....................... H03B 5/32 |
| | | 331/116 R |

(Continued)

FOREIGN PATENT DOCUMENTS

WO   WO-2011066387 A2 *   6/2011 ......... G06Q 20/4016

OTHER PUBLICATIONS

1. "The Acceleration Sensitivity of Quartz, Crystal Oscillators: A Review," by Raymond L. Filler, IEEE Transactions on Ultrasonics, Ferroelectrics, and Frequency Control, vol. 35, No. 3, May 1988.

(Continued)

*Primary Examiner* — Charlie Y Peng

(57) ABSTRACT

Disclosure of a novel accelerometer sensor method for detecting and measuring acceleration using paired radio frequency (RF) quartz crystal oscillators (QCO). Quartz crystal oscillators/resonators are known to be sensitive to acceleration or force impact events. Force impact events cause fluctuations in the quartz crystal resonator's natural resonant frequency. Normally this sensitivity to acceleration in QCOs is viewed as a negative property to be mitigated. This innovation exploits it in order to make a solid-state accelerometer with no mechanical parts. The crystalline structure of quartz crystal also has a preferred direction of maximum sensitivity to acceleration. There exists a mathematical relationship which relates these fluctuations in the resonator's natural frequency to the magnitude and direction of the accelerating source. Pairing acceleration sensitive QCO resonators will increase this sensor's sensitivity to acceleration. This will improve the measurement resolution for tracking changes in the QCO's frequency to determine the magnitude and direction of acceleration over time.

1 Claim, 8 Drawing Sheets

(56) References Cited

U.S. PATENT DOCUMENTS

Figure 1:
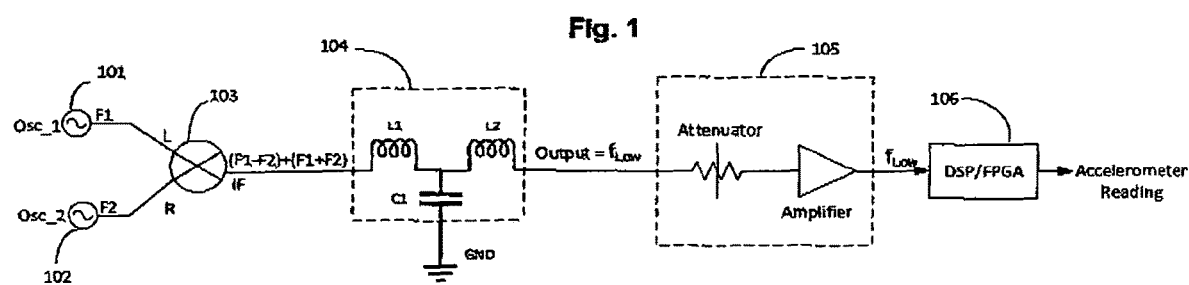

| | | | |
|---|---|---|---|
| 5,243,661 A | 9/1993 | Ohkubo | |
| 5,307,325 A | 4/1994 | Scheiber | |
| 5,362,636 A | 10/1994 | Xiang-Zheng | |
| 7,184,725 B2* | 2/2007 | Ruhm | H04B 1/24 455/138 |
| 7,367,232 B2 | 5/2008 | Vaganov-Belov | |
| 8,065,915 B2 | 11/2011 | Dwyer | |
| 8,610,517 B2 | 12/2013 | Clark | |
| 2010/0117750 A1* | 5/2010 | Fry | H03H 9/02086 331/162 |
| 2010/0121596 A1* | 5/2010 | Rodriguez | G01R 23/14 702/75 |
| 2014/0175183 A1* | 6/2014 | Phillips | F24H 9/0005 236/20 R |
| 2017/0350780 A1* | 12/2017 | Daito | G01L 9/08 |
| 2019/0055116 A1* | 2/2019 | Shirvani | B81B 7/008 |

OTHER PUBLICATIONS

4. "Time-Frequency Analysis of Systems with Changing Dynamic Properties", Section 2.2, by Samuel Case Bradford, California Institute of Technology Doctoral Thesis, 2006. pp. 1, 13-17.
"The Acceleration Sensitivity of Quartz, Crystal Oscillators: A Review," by Raymond L. Filler, IEEE Transactions on Ultrasonics, Ferroelectrics, and Frequency Control, vol. 35, No. 3, May 1988.
4. "Time-Frequency Analysis of Systems with Changing Dynamic Properties", Section 2.2 by Samuel Case Bradford, Califoria Institute of Technology Doctoral Thesis, 2006.

* cited by examiner

RADIO FREQUENCY ACCELEROMETER

CROSS REFERENCE TO RELATED APPLICATION

This patent application claims benefit of the Aug. 21, 2018 filing date of provisional patent application No. 62/720,860 which is incorporated by reference herein.

FIELD

This disclosure relates to a novel accelerometer method.

BACKGROUND

In this embodiment advantage is taken of the properties of quartz crystal oscillators (QCO) which are known to be susceptible to acceleration or force impact events. In the current state of the art, there are predominantly three types of accelerometers: 1. Micro-Electro-Mechanical Systems (MEMS) 2. Piezoelectric 3. Piezoresistive. In this embodiment will be disclosed a novel accelerometer based on a radio frequency (RF) electronics method.

SUMMARY

RF and microwave electronic systems normally require highly accurate and stable reference oscillators and are designed to be as least sensitive to frequency disturbances as possible. These oscillator frequency disturbances are known as jitter or phase noise. Quartz crystal oscillators are known to be susceptible to increases in jitter from acceleration or force impact events. And methods have been devised to mitigate this susceptibility as much as possible. However, in this embodiment, advantage will be taken of this susceptibility to configure a highly sensitive accelerometer.

Quartz crystal oscillators are typically made from precision cut AT type quartz crystals. In this embodiment, in order to detect very small acceleration events, AT cut oscillators would be selected to have the highest sensitivities possible to acceleration, known as g-sensitivities, where g is in reference to the earth's gravitational acceleration constant which is 9.81 meters per second squared at sea level.

BRIEF DESCRIPTIONS OF THE DRAWINGS

The invention is explained in the following descriptions of the drawings that are shown:

FIG. 1 Block diagram showing the elements in constructing the RF Mixer down-converter circuit and three methods of analysis.

Figure 2:
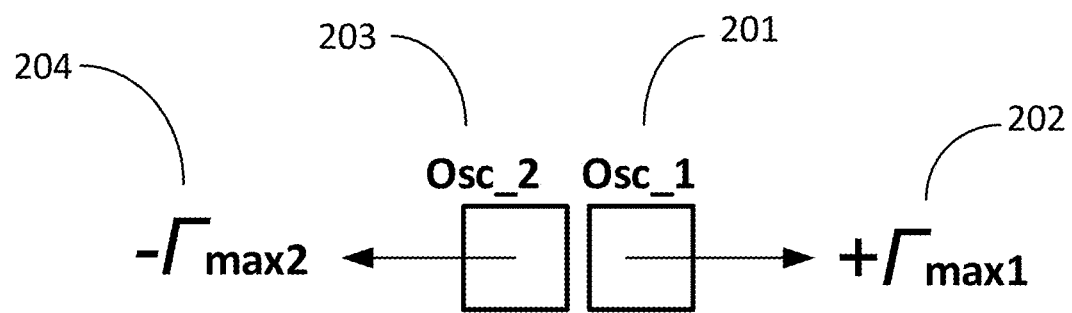

FIG. 2 Depiction of RF Accelerometer using two quartz crystal oscillators with the $\vec{\Gamma}_{max}$ of each oriented antiparallel.

Figure 3:
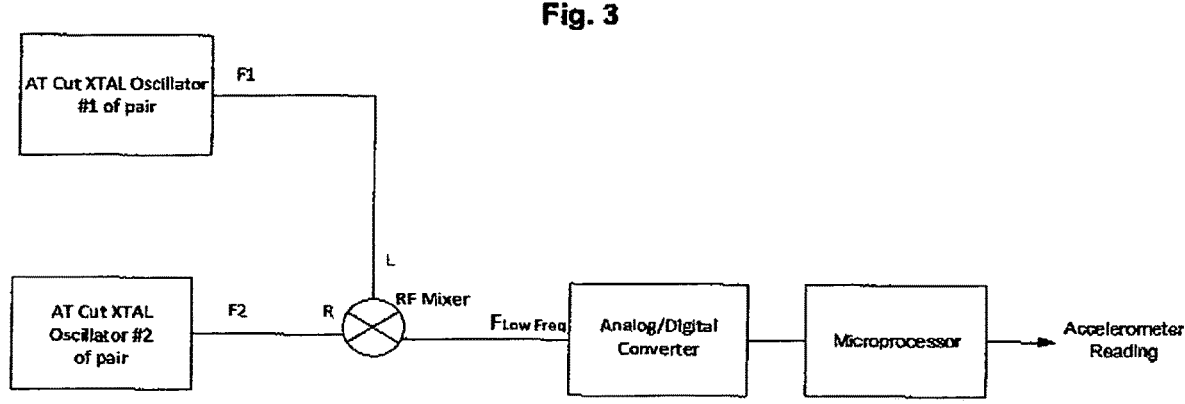

FIG. 3 Baseband frequency $f_{Low}$ analyzed with Microprocessor.

Figure 4:
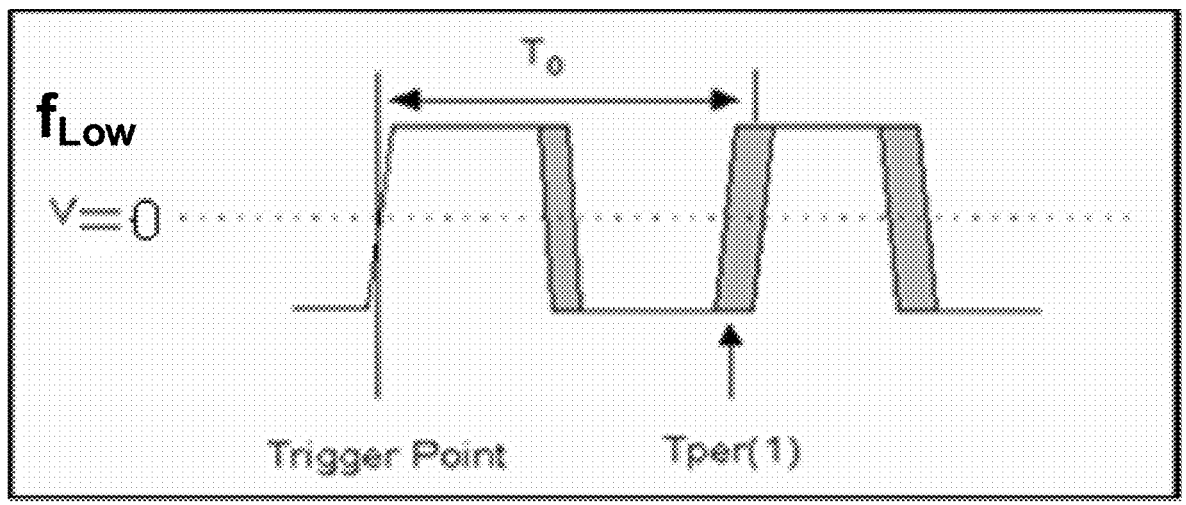

FIG. 4 Diagram of frequency $f_{Low}$ showing the Zero-point crossings of the dotted line V=0, and its Period, $T_0$.

Figure 5:
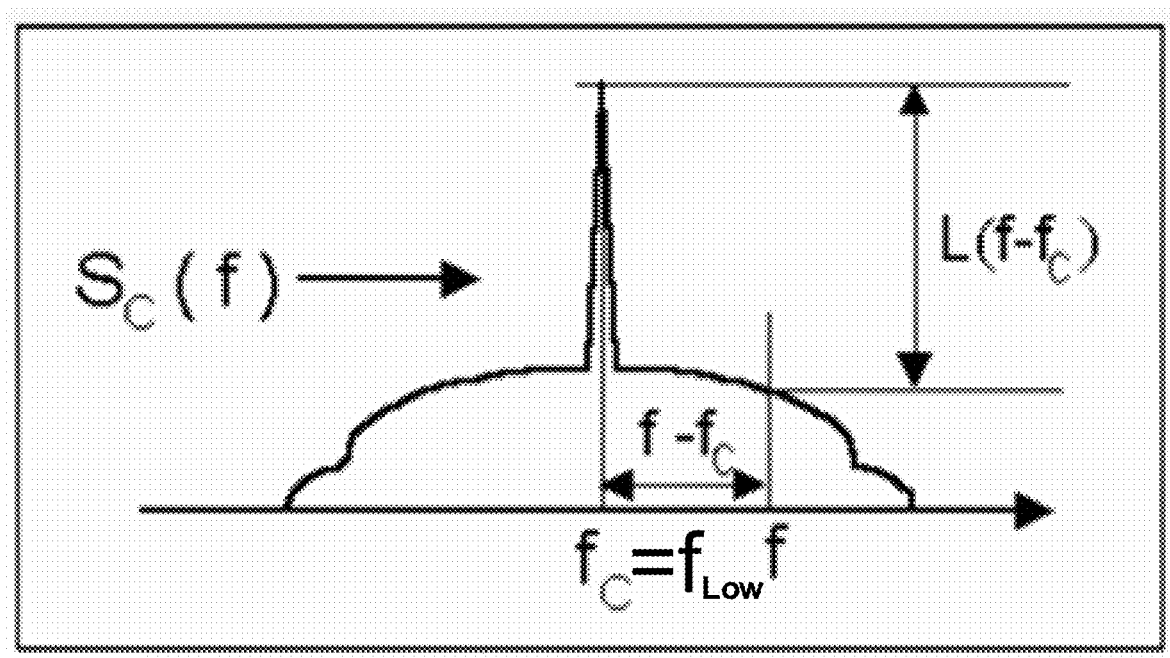

FIG. 5 Phase Noise spectrum diagram of the phase noise spectrum $L(f-f_{Low})$.

Figure 6:
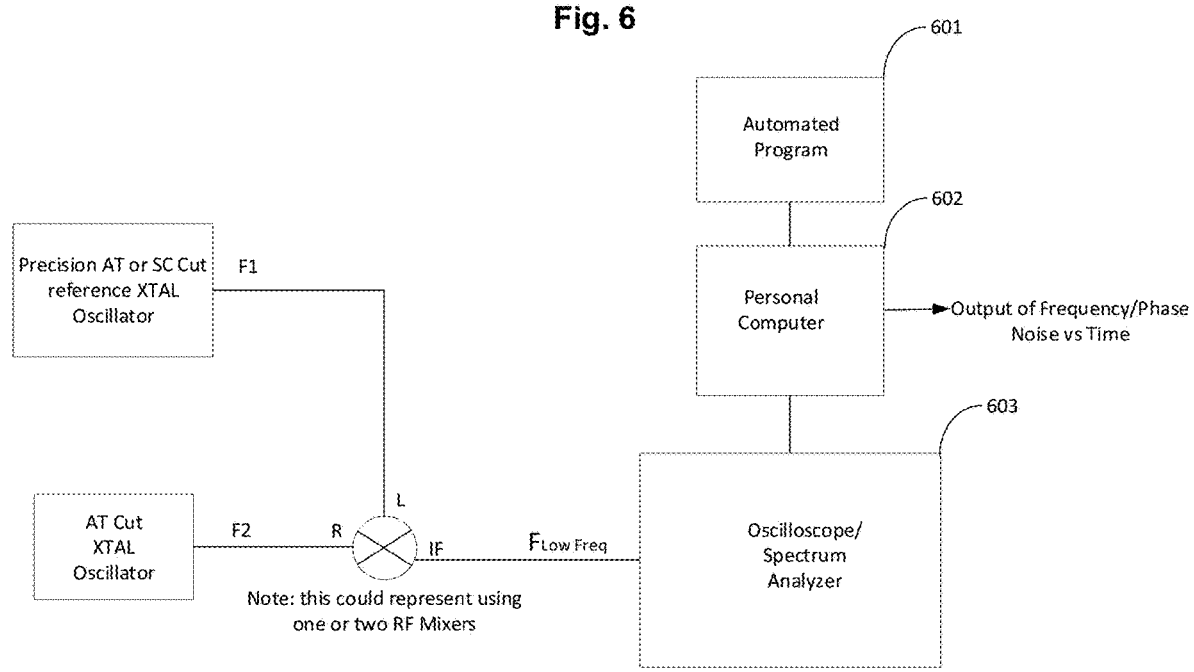

FIG. 6 Time versus Phase Noise or Frequency monitoring setup.

Figure 7:
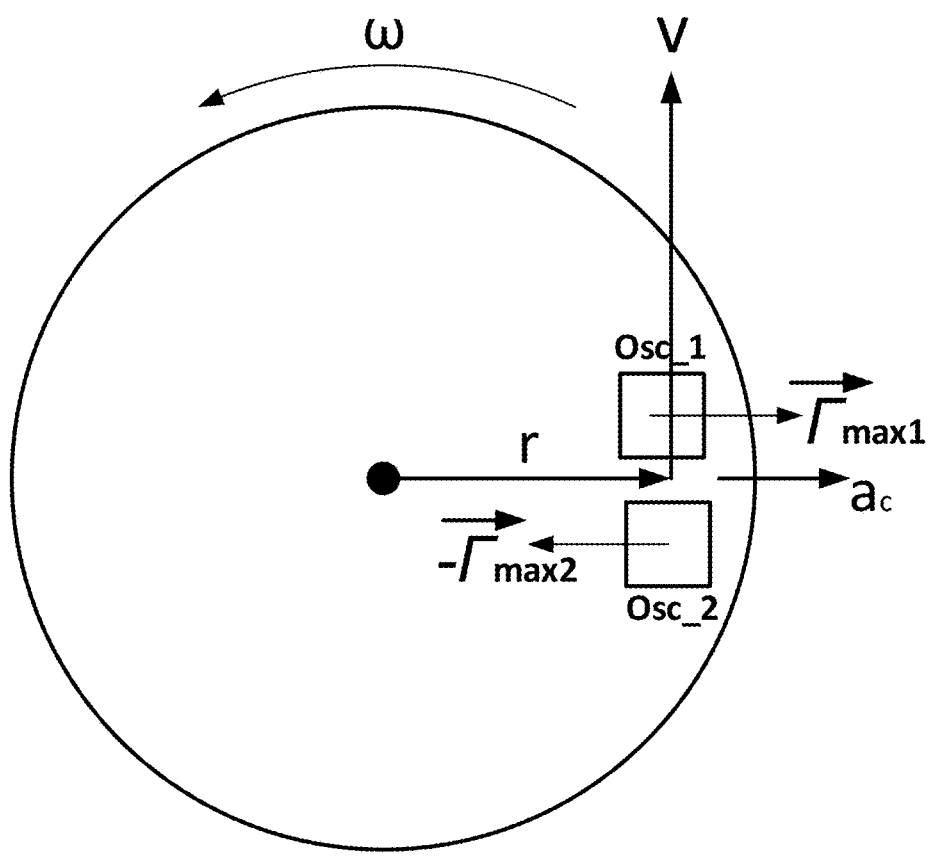

FIG. 7 Angular Centripetal Acceleration/Velocity monitoring setup.

Figure 8:
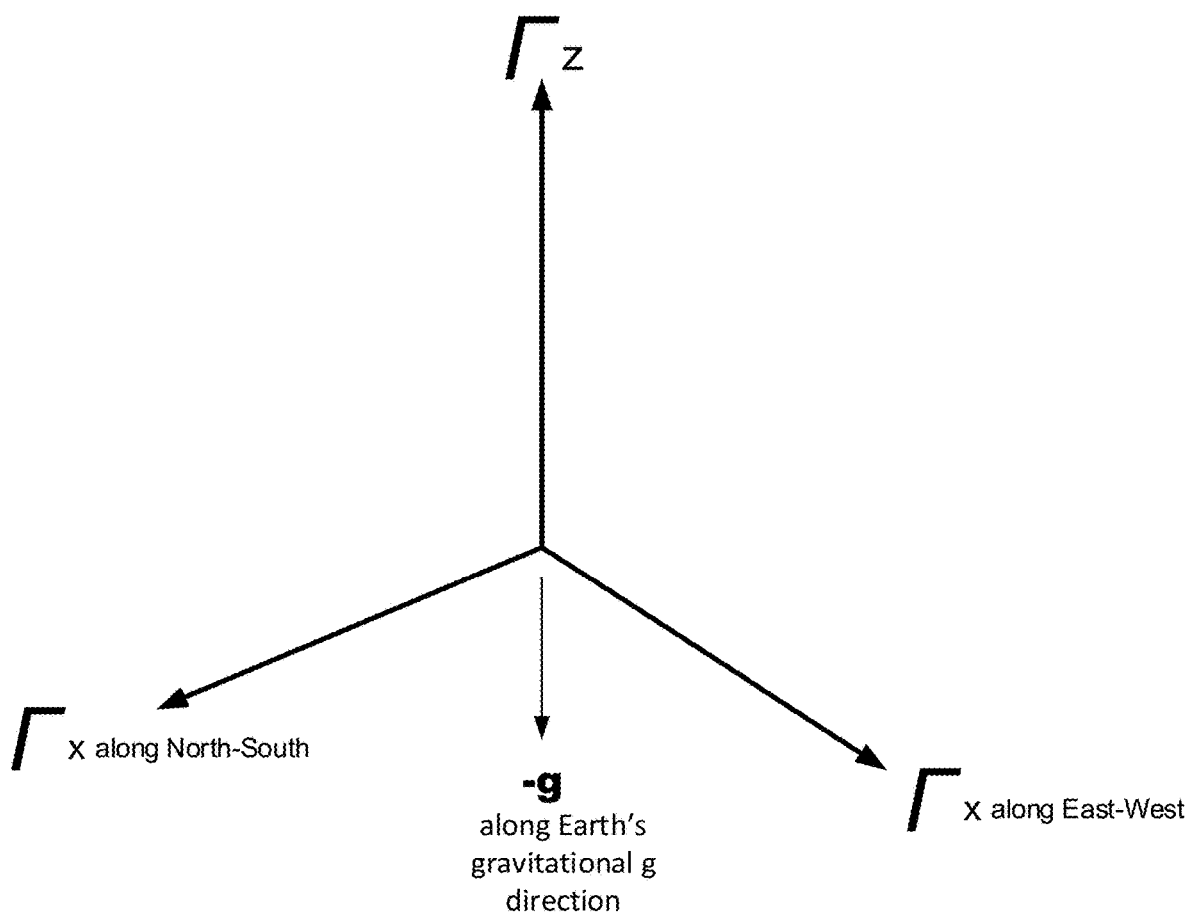

FIG. 8 Example of three RF sensors utilized for three-dimensional applications

DETAILED DESCRIPTION OF THE INVENTION

It has been shown empirically that the acceleration sensitivity of quartz crystal oscillators is a vector quantity; i.e. the shift in the quartz crystal oscillator resonant frequency is proportional to the magnitude and direction of the acceleration event. The resulting frequency is a function of acceleration and direction and can be expressed as the scalar or dot product of two vectors as shown as:

$$f(\vec{a}) = f_o(1 + \vec{\Gamma}_{max} \cdot \vec{a}) \qquad \text{EQUATION 1}$$

In Equation 1, $f_o$ is the quiescent natural resonant frequency of the quartz crystal oscillator without being affected by acceleration. $\vec{\Gamma}_{max}$ is the acceleration sensitivity vector of the quartz crystalline structure in the direction of its maximum sensitivity. Frequency $f(\vec{a})$ is the resonant frequency value resulting from the dot product of vector $\vec{a}$ and the maximum acceleration sensitivity parameter of the quartz crystal oscillator, $\vec{\Gamma}_{max}$. The vector dot product being defined by:

$$\vec{\Gamma}_{max} \cdot \vec{a} = |\vec{\Gamma}_{max}| * |\vec{a}| * \cos(\theta) \qquad \text{EQUATION 2}$$

where $\theta$ is the angle between the magnitudes of the $\vec{\Gamma}_{max}$ and $\vec{a}$ vectors.

Quartz crystal oscillators display this effect from linear dynamic acceleration caused by vibration or force impact events. This effect also displayed by constant or static acceleration, such as the earth's gravitational field, identified by the vector {right arrow over (g)}. Where we would substitute {right arrow over (g)} for {right arrow over (a)} in Equation 1. From Equation 1, we can see that in order to detect acceleration with high resolution, the AT cut quartz crystal should have as high a g-sensitivity parameter value, {right arrow over (GAMMA.)}.sub.max, as possible.

As seen from Equation 1, when there is zero acceleration, the $f(\vec{a})$ value is simply the nominal value $f_o$. However, when an acceleration is detected the nominal $f_o$ frequency will change by an amount $\Delta f(\vec{a})$ equal to:

$$\Delta f(\vec{a}) = f_o * (\vec{\Gamma}_{max} \cdot \vec{a}) \qquad \text{EQUATION 3}$$

The quartz crystal oscillator would need to be calibrated to determine the direction and maximum value of the $\vec{\Gamma}_{max}$ vector.

In an embodiment presented here, the detecting means of accelerated motion would comprise of two quartz crystal oscillators with radio frequency outputs in as high a frequency range as possible. The higher the base resonant frequencies of each crystal oscillator, the higher will be the resolution of this sensor as will be explained below. The two quartz crystal resonators should Ideally be fabricated from the same source crystal for the electrical characteristics of each to match as closely as possible. The two resonators could be packaged separately or in the same package. The two said quartz crystal radio frequency signals would be of approximately equal (but not exactly equal) frequencies. This is in order for a radio frequency (RF) mixer to down-convert the two said radio frequencies to a lower baseband frequency. During an acceleration event, the said down-converted baseband frequency will exhibit an increase in fluctuations/jitter to its baseband frequency signal. These said fluctuations will be due to the two source resonator signals experiencing frequency fluctuations during an acceleration event. These fluctuations would then be digitally processed and analyzed to render a measure of the magnitude and direction of said detected acceleration event.

FIG. 1 Illustrates the implementation of the embodiment by means of a radio frequency downconverter using an RF mixer 103. The RF mixer takes the frequencies F1 and F2 of QCO sources Osc_1 101 and Osc_2 102, and produces a down converted output of (F1−F2) and an up converted output of (F1+F2). In this embodiment we are interested in the downconverter (F1−F2) output signal. Therefore, a bandpass filter 104 centered on the (F1−F2) signal would be employed to filter out the said (F1+F2) output as illustrated in FIG. 1. The attenuator and amplifier circuitry 105 that follow the bandpass filter 104 could be employed to adjust the (F1−F2) signal power to an appropriate level as needed. The Osc_1 101 source could be connected to the Local Oscillator port or LO. The Osc_2 102 source would then be connected to the Radio Frequency port or RF. And the output of the RF mixer 103 Is referred to as the Intermediate Frequency or IF as indicated In FIG. 1 where the unfiltered output would be the combination of frequencies of (F1−F2) and (F1+F2).

To enhance the sensitivity of this sensor, the two oscillator sources would be aligned such that the maximum sensitivity vectors ($\vec{\Gamma}_{max1}$ 202 of oscillator Osc_1 201 and $\vec{\Gamma}_{max2}$ 204 of Osc_2 203, oscillator) are anti-parallel to each other as illustrated in FIG. 2. Therefore, if an acceleration event is in the direction of the $\vec{\Gamma}_{max1}$ 202 for the Osc_1 201 oscillator, the nominal frequency of F1 will be positively increased with the acceleration, while frequency F2 of Osc_2 203, will correspondingly decrease.

Therefore, the difference of the signals (F1−F2) out of the RF mixer 103 will be $f_{Low}$, given by:

$$f_{Low}=f(\vec{a})_1-f(\vec{a})_2=(f_{o1}+\Delta f(\vec{a})_1)-(f_{o2}-\Delta f(\vec{a})_2)=(f_{o1}-f_{o2})+f_{o1}*(\vec{\Gamma}_{max1}\cdot\vec{a})+f_{o2}*(\vec{\Gamma}_{max2}\cdot\vec{a}) \quad \text{EQUATION 4}$$

Where $\Delta f(\vec{a})_2$ will be negative with respect to $\Delta f(\vec{a})_1$, since the $\vec{\Gamma}_{max}$ vectors of the sources are configured to be in opposite directions. With the crystalline structure of the two oscillators aligned anti-parallel, the $\vec{\Gamma}_{max}$ of each is pointing in the opposite direction making the final frequency $f_{Low}$ equal to the difference in the base resonant frequencies ($f_{o1}-f_{o2}$), plus the addition of the frequency changes in sources due to the accelerating event. The total change in frequency due to the acceleration would therefore be the sum of $\Delta f(\vec{a})_1$ and $\Delta f(\vec{a})_2$ given by:

$$\Delta f(\vec{a})_{Total}=f_{o1}*(\vec{\Gamma}_{max1}\cdot\vec{a})+f_{o2}*(\vec{\Gamma}_{max2}\cdot\vec{a}) \quad \text{EQUATION 5}$$

In order to further enhance the sensitivity and increase the resolution of this radio frequency accelerometer sensor, higher values of the original nominal values ($f_{o1}$ and $f_{o2}$) of the oscillators would be used to increase the resulting change in $\Delta f(\vec{a})_{Total}$, as given in EQUATION 5.

After the two source signals are down converted to the baseband frequency, f.sub.Low, digital signal processing methods would be utilized to analyze this signal which will correlate the frequency variations caused from an acceleration or force impact event. The f.sub.Low signal would be analog to digitally converted and applied to a microprocessor, which would carry out the analysis, as illustrated in FIG. 3. Thereby producing the acceleration reading.

The resulting down converted $f_{Low}$ frequency will display jitter as illustrated in FIG. 4 where $T_o$ represents the period of frequency $f_{Low}$. This jitter results in a characteristic power spectrum pattern known as phase noise as depicted in FIG. 5 (Where center frequency $f_C=f_{Low}$ in FIG. 5). The frequency, $f_{Low}$, would then be processed and analyzed by the Microcontroller to determine the zero to zero-point crossings of $f_{Low}$.

This type of analysis would be advantageous since in the case of frequency versus time analysis, if we are attempting to track the frequency vs time sequence of the $f_{Low}$ frequency fluctuations, there is an inherent limitation as indicated by a principle related to the Heisenberg Uncertainty principle called the Heisenberg-Gabor Uncertainty Principle. The Heisenberg-Gabor Uncertainty Principle states that it is not possible to monitor both the exact frequency shifts and the exact time the shifts occur with arbitrary accuracy. Given mathematically by:

$$\Delta\omega\times\Delta t >= \tfrac{1}{2}, \quad \text{EQUATION 6}$$

Applying this principle to this application, the uncertainty in the time period measurement, $\Delta T_o$, is $\Delta T_o=\Delta t$. The uncertainty in the $f_{Low}$ frequency shifts measurement is related to angular frequency $\Delta\omega$ by, $\Delta\omega/2\pi=\Delta f_{Low}$, which would result with as follows:

$$\Delta\omega\times\Delta t = \Delta f_{Low}\times 2\pi\times\Delta T_o >= \tfrac{1}{2}, \text{ or:}$$

$$\Delta f_{Low}\times\Delta T_o >= \tfrac{1}{4\pi} \quad \text{EQUATION 7}$$

To mitigate this limitation, rather than track frequency variations over time, the time period of the baseband $f_{Low}$ signal, $T_o$, would be monitored for cycle to cycle variations. With today's high-speed Microcontroller, unprecedented resolution and sensitivity to very small accelerations could be attained compared to currently available accelerometers. The high-speed Microcontroller would be utilized to extract very small frequency fluctuations by monitoring the changes in the period $T_o$ of frequency $f_{Low}$. The practical limiting factor in recording the time the period $T_o$ measurement would be made and the duration of the period, $T_o$, would be +/− the time resolution of the Microcontroller clock itself. Which would depend on the sampling rate of the Microcontroller. Which with today's Microcontroller would be very high. The fluctuations in $T_o$ as depicted in FIG. 4 by the shaded area, could therefore be accurately measured and correlated to acceleration events over time.

Another analysis method would be as follows. One could track phase noise detected by the down-converted baseband frequency, as explained previously, using a spectrum analyzer setup for phase-noise measurements. In this method, after the output frequencies of the oscillator sources have been down converted and low pass filtered, if the IF output (F1−F2) is at a relatively high frequency level, a conventional Spectrum Analyzer 603 could be used, See FIG. 6. In using a Spectrum Analyzer 603, one could measure the phase noise of the (F1−F2) signal. As depicted in FIG. 4, there would be jitter on the baseband (F1−F2) signal with a nominal period $T_o$ resulting in phase variations along the dotted line of the voltage threshold, $V_{th}$ level crossings. There always exists some jitter on all QCO signals causing some nominal phase noise even with zero acceleration. Jitter in the nominal $f_o$ frequency would increase at the moment of an acceleration or force impact event. A Spectrum Analyzer based measurement system controlled by a Personal Computer 602, could be designed with automated programming 601 to automate tracking and recording of the signal phase noise over time. Statistical methods could be utilized to monitor and compare the phase noise of a signal during quiescent periods with times and correlate the phase noise measured to the acceleration or force impact events.

Alternatively, one could utilize an Oscilloscope and again automate measurements by programming control of the oscilloscope through the Personal Computer to monitor and record frequency over time, see FIG. 6. Choice of which setup to use would depend on which configuration would be the most efficient, cost effective and produce the most accurate tracking of the effects of acceleration over time.

This embodiment has been shown to be applicable to measurements of linear acceleration. One could as well take the measurements of acceleration and apply mathematical integration to calculate linear velocity. The embodiment could also be utilized for measurements of angular acceleration or velocity as illustrated in FIG. 7. The paired quartz crystal oscillators are placed on a spinning circular platform along the radius of the circle platform. The two oscillator sources are placed in the anti-parallel configuration as presented in FIG. 2. However as shown in FIG. 7, the two QCOs would be configured right next to each other so as to place each of them at the same radius distance. In this configuration the oscillators will pick up the centripetal acceleration $\vec{a}_c$ of the spinning platform with angular velocity ω, with the centripetal acceleration given by:

$$\vec{a}_c = v^2/r \qquad \text{EQUATION 8}$$

And each QCO would pick up the same tangential velocity, V, at the point where they are attached on the spinning platform.

A single said stand-alone RF accelerometer sensor of this embodiment can be used in the detection of acceleration along any arbitrary direction. Or three sensors could also be utilized for three-dimensional applications with, for example, the main axis of highest acceleration sensitivity $\vec{\Gamma}_{max}$ of each of three RF accelerometer sensors aligned along the direction of the three-orthogonal axis as depicted in FIG. 8. The three RF sensor g-sensitivities could be aligned with $\vec{\Gamma}_x$ along the North-South, $\vec{\Gamma}_y$ along the East-West and $\vec{\Gamma}_z$ along the negative z-direction of earth's −g local static acceleration value.

As mentioned previously, this RF Accelerometer sensor can detect the earth's static gravitational acceleration, $\vec{g}$. Variations in $\vec{g}$ over the earth's surface could therefore be measured. This embodiment could therefore find application in geological subsurface analysis and exploration. This embodiment could also be applied as a seismometer to detect seismic activity using for example the three-dimensional arrangement shown in FIG. 8.

What is claimed:

1. A method of using an accelerometer sensor comprising:
   Providing a first quartz crystal resonator with maximum acceleration sensitivity vectors of the highest sensitivity values and operating at the highest practical resonant frequencies (F1);
   Providing a second quartz crystal resonator with maximum acceleration sensitivity vectors of the highest sensitivity values and operating at the highest practical resonant frequencies (F2);
   Producing a down converted output signal (F1−F2) and an up converted output signal (F1+F2) using a radio frequency mixer;
   Filtering out the up converted output using a bandpass filter centered on the down converted output signal so that a change in the down converted output signal (F1−F2) effectively provides a doubling of the sensitivity to a measured acceleration event;
   Adjusting power of the down converted output signal using an attenuator and amplifier circuitry following the bandpass filter;
   Analyzing the filtered and adjusted down converted output signal using an oscilloscope, a spectrum analyzer or a microcontroller to determine the magnitude of acceleration from the change in frequency of the down converted output signal (F1−F2); and
   Wherein the maximum acceleration sensitivity vectors of the first and second quartz crystal resonators are aligned in parallel but opposite directions;
   Wherein the highest practical resonant frequencies (F1 and F2) of the first and second quartz crystal resonators are of close but not equal values.

* * * * *